June 1, 1926.
F. X. GOVERS
1,586,987
HEATING METHOD AND APPARATUS
Filed April 2, 1921     3 Sheets-Sheet 2
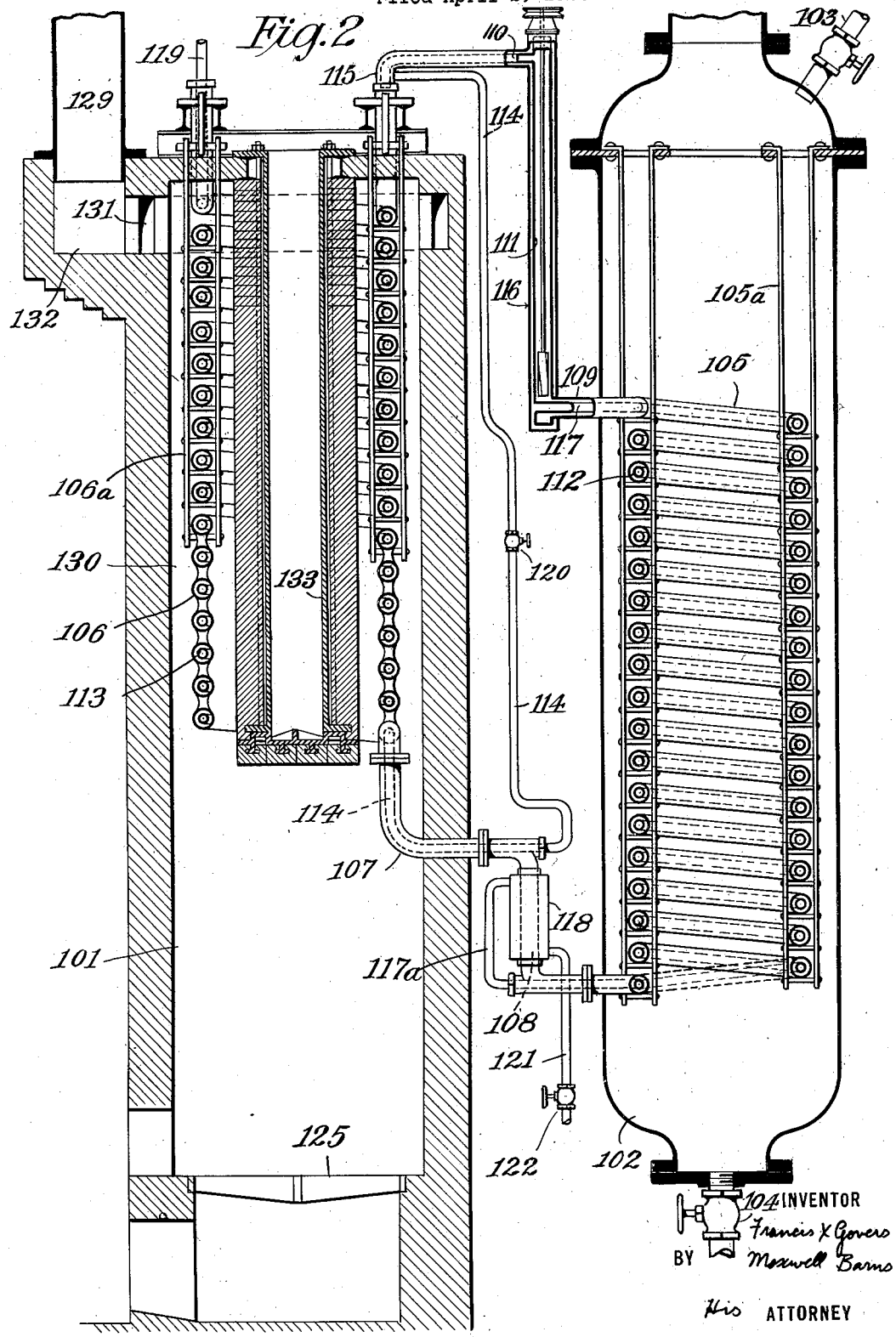

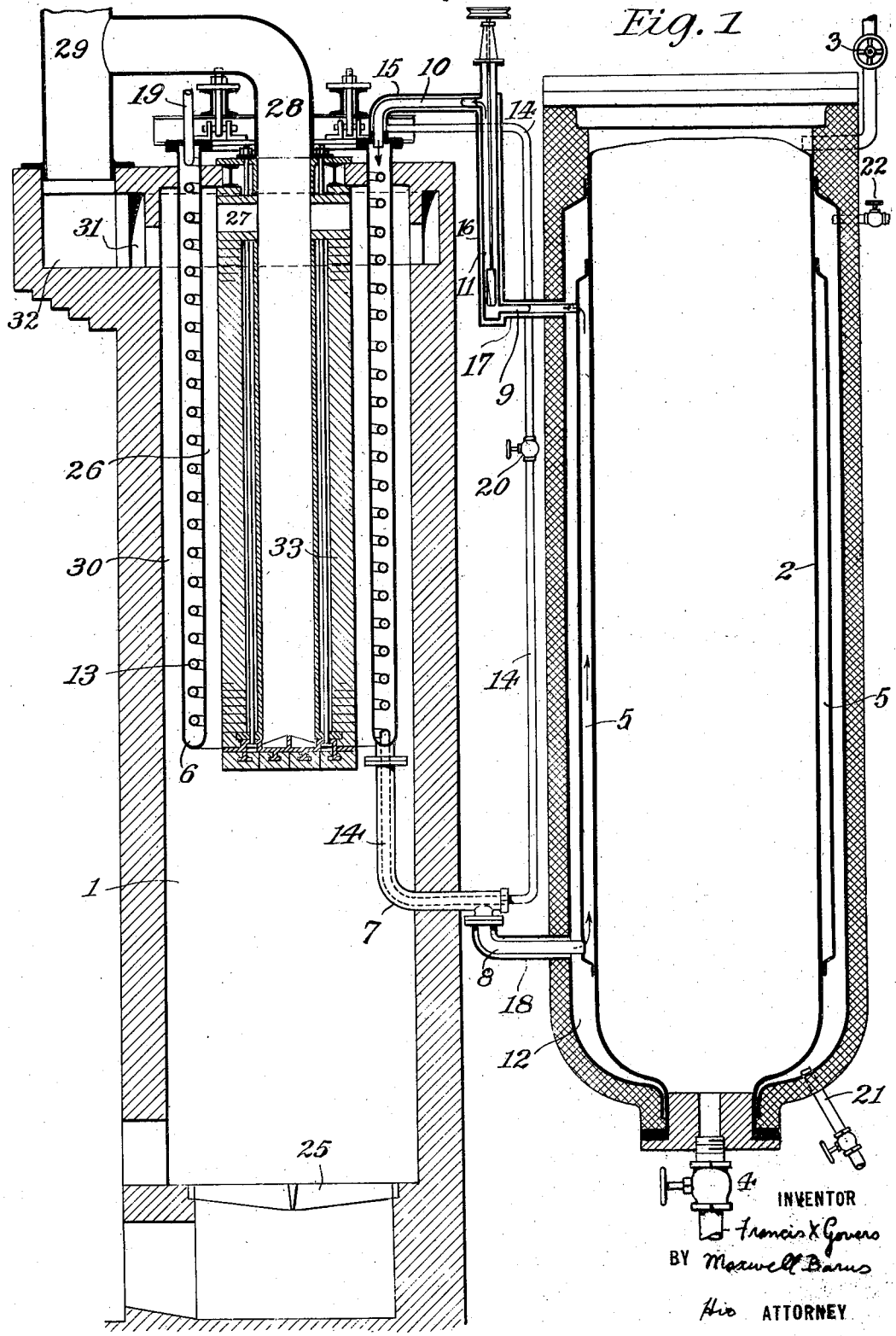

June 1, 1926.
F. X. GOVERS
1,586,987
HEATING METHOD AND APPARATUS
Filed April 2, 1921
3 Sheets-Sheet 3
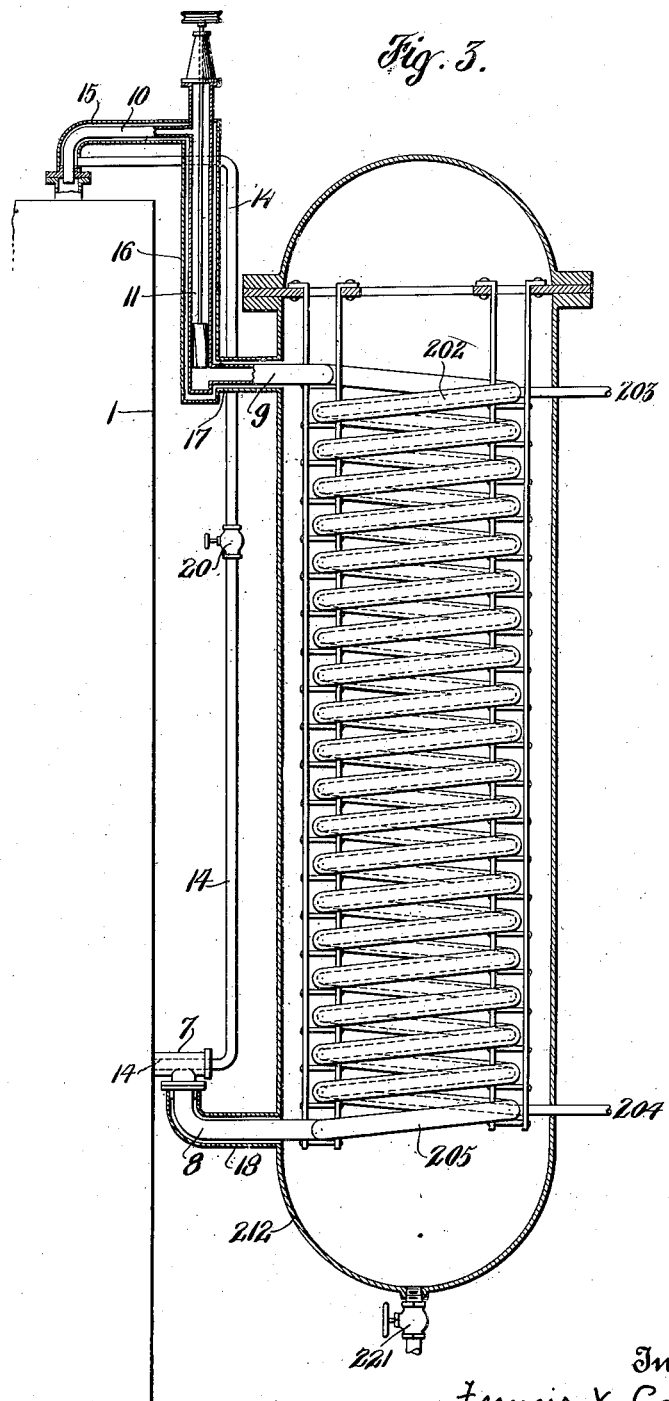

Patented June 1, 1926.

1,586,987

UNITED STATES PATENT OFFICE.

FRANCIS X. GOVERS, OF NEW YORK, N. Y.

HEATING METHOD AND APPARATUS.

Application filed April 2, 1921. Serial No. 458,030.

This invention comprises a novel process and apparatus applicable to the heat treatment at relatively high temperatures of a wide variety of substances, but more particularly such substances as exist, at the temperature in question, in a fluid state, and require for their proper and economical treatment a high rate of heat transfer between the fluid mass and the heating or heat-controlling medium. Such conditions arise in many commercial operations, particularly such as involve some change of physical or chemical state in the charge under treatment, typical examples being the distillation, either with or without cracking or other decomposition, of mineral oils and other hydrocarbons; the condensation of vapors at high temperatures; and chemical reactions in general, whether exothermic or endothermic, where the heat development or absorption occurs or is liable to occur at a high rate, and the heat must in consequence be transferred at a high rate from or to the charge in order effectively to control its temperature.

According to my invention I circulate a liquid heat-controlling medium in thermal contact, but out of physical contact, with the material to be treated, the heat-controlling medium being one which is solid at normal or higher temperatures (say 50° C. or higher) but exists at the desired operating temperature as a mobile but chemically and physically stable liquid. Examples of media of this type are lead and fusible lead alloys, such as lead-tin alloys of the solder type; but my invention is not limited to these materials, or even to materials of metallic nature, since for certain purposes I may employ other fused or molten bodies of high stability and mobility, as for example fusible salts or salt-mixtures of which many are known, in connection, for example, with the highly developed art of electrolyzing fused baths for the production of sodium, magnesium, aluminum and other metals.

Material such as lead, solder, etc., are, however, particularly advantageous because of their high specific heat per unit of volume due to their great density, and also because of their capacity for rapidly absorbing, delivering and transferring heat. Moreover, heating media of this type may be used indefinitely without exhaustion or replacement.

My invention is particularly applicable to high temperature reactions of the kind described and for this purpose the heat controlling medium should be one which is liquid and stable at temperatures upwards of 400° C.

It is well understood that many, if not most, chemical reactions require, for the best results, to be carried out within a definite temperature range which is often restricted to a very few degrees of the thermometric scale, a more or less definite pressure being also often requisite; but even where the optimum reacting conditions are definitely known, great difficulties arise in practice, on any considerable operating scale, in continuously maintaining such optimum conditions; more particularly, as stated above, in those cases wherein heat is absorbed at a rapid rate (vaporization processes, endothermic reactions, etc.) or is liberated at a rapid rate (condensation of vapors, exothermic reactions, etc.). Such difficulties are, of course, greatly accentuated in those cases, which are of common occurrence, in which the first reaction stage proceeds with strong heat-evolution, followed by a stage requiring the supply of heat. My present invention is applicable to all such conditions, and is effective for the very close control of temperatures even at relatively very high temperature ranges.

In a simple embodiment, my invention contemplates circulating a heat-controlling medium, such as a fusible alloy of lead and tin, through a closed system of high heat-conductivity (steel or iron walls or special metals or materials required by the particular conditions or which may be desired for catalytic effects) this system being at one point in extended thermal contact with the charge to be treated, and at another point provided with heat-adjusting means (reheating furnaces, etc.) adequate to control the temperature of the medium brought into thermal contact with the charge. The medium is positively circulated by appropriate devices, such as centrifugal pumps or the like, the rate of circulation being controlled according to the specific requirements. For example, in case a large body of mineral oil is required to be maintained within narrow temperature limits for a definite time, the molten alloy may be circulated through the thermal contact system, comprising, for example, a surrounding jacket, or internal tubes or coils, or both of these elements, at such rate that the fall of temperature during transit in thermal contact with the charge is less than the prescribed temperature limits; thereby ensuring that no portion of the charge contacting with the heated surfaces is subjected to a temperature either above or below the requirements. Similarly in case of exothermic reactions, a like procedure ensures that all portions of the charge tending to a temperature above the permissible limit will contact with surfaces at a lower temperature and possessing therefore a cooling function. In this manner, as will be readily understood, an almost absolute temperature control of even very "stormy" reactions may be maintained. Moreover, conditions of pressure, time, temperature gradient, etc., may be varied almost at will in exceptionally simple and safe types of apparatus. It will readily be seen that this manner of controlling the temperature lends itself readily to either small or large scale unit production, and to operations of either batch or continuous type.

Since the heat-controlling media contemplated herein are solid at ordinary temperature ranges, means for bringing the walls of the circulating system preliminarily to a temperature sufficient to ensure against obstruction through freezing or solidification of the medium are provided. This may be accomplished in various ways, including electrical resistance heating, etc.; but I prefer to employ superheated steam as hereinafter fully disclosed.

The present invention is to be clearly distinguished from processes wherein molten lead or the like is showered down through a liquid bath or otherwise brought into physical contact with the charge. Such processes do not lend themselves to conditions requiring close temperature control, are wholly inapplicable to baths or charges capable of reacting with lead or equivalent heating media at high temperatures, and in general possess only limited utility.

My invention will be explained by reference to certain specific embodiments thereof, illustrated in the accompanying drawings, wherein:

Fig. I represents one form of my apparatus, and Figs. II and III modified forms.

Referring to Fig. I, a furnace 1 is shown and a vessel 2 is provided into which the material to be heated is introduced by the inlet valve 3 and from which it may be withdrawn by the outlet valve 4.

The temperature controlling medium circulating system comprises the annular heat transferring chamber 5 surrounding the vessel 2; the annular heat absorbing chamber 6 in the furnace 1; the communicating pipes 7, 8 (below) and 9, 10 (above); and the circulating pump 11 which may be of any suitable construction. This circulating system is filled with lead, solder or other suitable material as hereinbefore specified.

The preliminary heating system comprises the annular chamber 12 surrounding the heat transferring chamber 5 of the vessel 2, and the heating coil 13 in the furnace 1 (which may be placed within the heat absorbing chamber 6 as illustrated), and the communicating pipes and jackets 14, 15, 16, 17, 18, which, as indicated, substantially enclose or are enclosed by the temperature control medium circulating system, so that in starting the apparatus heat may be transferred by the preliminary heating system to substantially all parts of the medium circulating system, so as to fuse the medium and make circulation of the medium possible.

In the preliminary heating system superheated steam may be conveniently used, being forced into the system through the inlet pipe 19 of the coil 13, further heated in its passage downward through that coil, and then transferring its heat to and fusing the medium as it passes through pipes 14, 15, 16, the chamber 12 and the jackets 17 and 18. A valve 20 is conveniently located in the pipe 14 to shut off the flow. In the chamber 12 a draw-off valve 21 is provided to remove any condensation that may be formed and to regulate the pressure in the system and the rate of flow through the chamber 12.

When the temperature controlling medium has been fused, the pump 11 is started, causing the same to begin circulation. The supply of steam for the preliminary heating system may then be cut off, for obviously the preliminary heating system will not have to be used again unless and until the medium is allowed to solidify in part or all of the system.

The medium passes downward through the heat absorbing chamber 6, absorbing heat, and thence by the communicating pipes 7 and 8 to the heat transferring chamber 5. Then it passes upward through the chamber 5, leaving it by the pipe 9 and passing through the pump 11 and pipe 10, to the top of the heat absorbing chamber 6 again.

By closing the valve 20, the preliminary heating chamber 12 may be exhausted through the valve 22, if desired, for the purpose of conserving the heat in the vessel 2.

By regulating the furnace 1 and the speed of the pump 11 the rate and conditions of transfer of heat can be very nicely controlled.

The furnace 1 may be conveniently of the type illustrated in Fig. 1, having a grate 25 from which the products of combustion pass upwardly and divide, some going by the flues 26, 27 and 28 to the chimney 29, thus passing within the cylindrical chamber 6 and imparting heat to its inner wall, the rest going by the flues 30, 31 and 32 to the chimney 29, thus passing outside the cylindrical chamber 6 and imparting heat to its outer wall.

The baffle of refractory material 33 serves to make the products of combustion choosing the inner path pass close to the inner wall of the chamber 6, and it also absorbs heat and radiates the same upon the inner walls of the chamber 6.

The modified apparatus shown in Fig. II is essentially like that of Fig. I just described, but it has the advantage of providing a larger heating surface within the heating vessel. It is sometimes desirable, in cases where catalytic action of the heating surface plays an important part. In such case the heat transmitting coil is either made of or plated with catalytic material.

Referring to Fig. II of the drawings, 101 is a furnace and 102 is a vessel into which the material to be treated may be introduced by the inlet valve 103 and withdrawn by the outlet valve 104.

The medium circulating system comprises the heat transferring coil 105 (which is hung in the rack 105ª in the vessel 102), the heat absorbing coil 106 (which is hung in the rack 106ª in the furnace 101), and the communicating pipes 107 and 108 (below), and 109 and 110 (above), and the pump 111. This medium circulating system is filled with lead, solder, or other suitable material as described in connection with Fig. I.

The preliminary heating system comprises the interior coil 112 inside the coil 105, and the interior coil 113 inside the coil 106, and the communicating pipes and jackets 114, 115, 116, 117, 117ª and the jacket 118. Superheated steam is forced into this preliminary heating system by the pipe 119, heated further in passing downward through the coil 113; thence it passes by pipes 114, 115 and 116 to the coil 112, and downwardly through that coil, escaping by the pipe 117ª into the jacket 118 and being finally drawn off through the pipe 121. The flow may be controlled by the valves 120 in the pipe 114 and 122 in the outlet pipe 121.

It will be clear from Fig. II that the preliminary heating system surrounds or is surrounded by substantially the entire medium circulating system and thus readily permits the transfer of heat to melt the circulating medium in starting operations.

The operation and control of the device of Fig. II is like that of the device of Fig. I.

The furnace shown in Fig. II comprises the grate 125, and flues 130, 131 and 132 and baffle 133. Since the coil 106 is permeable by the products of combustion, the separate flues provided in Fig. I for heating the exterior and interior walls of the chamber 6 are not needed with the form of apparatus illustrated in Fig. II.

In the modification shown in Fig. III, 1 represents the furnace shown in Figure I. Since the construction and operation of all parts of the apparatus within this furnace may be the same as that heretofore illustrated and described in connection with the apparatus of Fig. I, they are not again described.

The steam pipes and jackets of the preliminary heating system 14, 15, 16, 17 and 18 and valve 20 are also as shown and described in Fig. I, but the pipes 17 and 18, instead of communicating with an annular steam chamber 12 as in Fig. I connect with the large casing 212 which surrounds the temperature controlling medium coil 205. The flow of steam for preliminary heating is controlled by the valve 221.

Again the pipes 8, 9 and 10 and pump 11, which deliver and withdraw the temperature controlling medium as described in connection with Fig. I instead of communicating with the annular heat transferring chamber 5 as in Fig. I, connect with the heat transferring coil 205. Within the heat transferring coil 205 is the coil 202 into which the material to be treated is forced by the pipe 203 and from which it is withdrawn by the pipe 204. Thus the material to be treated is forced through the coil 202 in countercurrent to the temperature controlling medium in the coil 205. By this arrangement a very fine adjustment of temperature conditions may be obtained.

From the foregoing description it will be obvious that many changes may be made in the form and details of the apparatus and process without departing from the spirit and scope of my invention.

What I claim is:

1. Process for thermally treating a charge under temperature-controlled conditions, comprising mechanically circulating a temperature-controlling medium in thermal contact but out of physical contact with the charge, said medium being solid at normal temperature but liquid and stable at the operating temperature.

2. Process according to claim 1 in which the circulating medium consists of molten metal or alloy.

3. Process according to claim 1 in which the circulating medium comprises molten lead.

4. In the process of thermally treating a charge, pre-heating a closed circulating system in thermal contact with the charge, and then mechanically circulating therethrough in thermal contact but out of physical contact with the charge, a temperature-controlling medium which is fluid and stable at temperatures upwards of 400° C.

5. Process according to claim 4 in which the circulating medium consists of molten metal or alloy.

6. Process according to claim 4 in which the circulating medium comprises molten lead.

7. Apparatus for thermally treating materials under temperature-controlled conditions comprising in combination, a container, means for circulating in a flowing stream a temperature-controlling medium through a closed mechanically circulating system in thermal contact but out of physical contact with the charge in said container, and a temperature controlling medium solid at normal temperatures but fluid at operating temperatures.

8. Apparatus for thermally treating materials under temperature-controlled conditions comprising in combination, a container, means for mechanically circulating in a flowing stream a temperature-controlling medium through a closed circulating system in thermal contact but out of physical contact with the charge in said container, and means independent of the circulating medium for heating the circulatory system.

9. Apparatus for thermally treating materials under temperature-controlled conditions comprising in combination, a container, means for mechanically circulating in a flowing stream a temperature-controlling medium through a closed circulating system in thermal contact but out of physical contact with the charge in said container, means exterior to said container for supplying heat to the circulating medium, and means independent of the circulating medium for heating the circulatory system.

10. Apparatus for thermally treating materials under temperature-controlled conditions comprising in combination, a container, means for mechanically circulating in a flowing stream a temperature-controlling medium through a closed circulating system in thermal contact but out of physical contact with the charge in said container, and means exterior to said container for supplying heat to the circulating medium, and a temperature controlling medium fluid and stable as fluid at temperatures upwards of 400° C.

11. Apparatus for thermally treating materials under temperature control conditions comprising in combination a container, means for mechanically circulating a temperature controlling medium through a closed circulating system in thermal contact out of physical contact with the charge in said container, means exterior to said container for supplying heat to the circulating medium, additional means for heating the circulating system and a temperature controlling medium fluid and stable at temperatures upwards of 400° C.

FRANCIS X. GOVERS.